June 4, 1968     A. E. R. ARNOT     3,386,837
FOODSTUFF PACKAGING
Filed Oct. 22, 1965     2 Sheets-Sheet 1
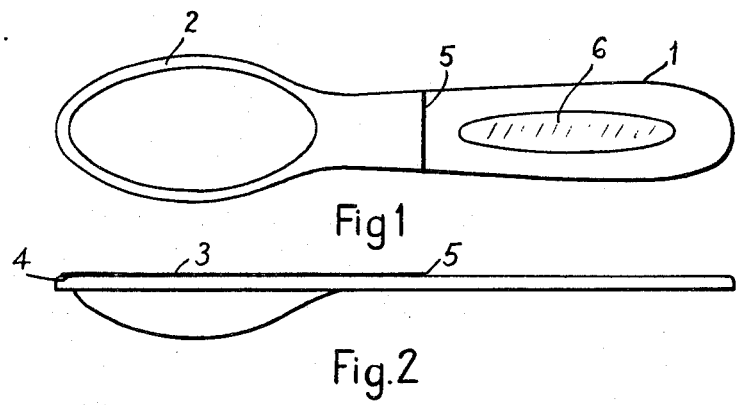
Fig.1
Fig.2
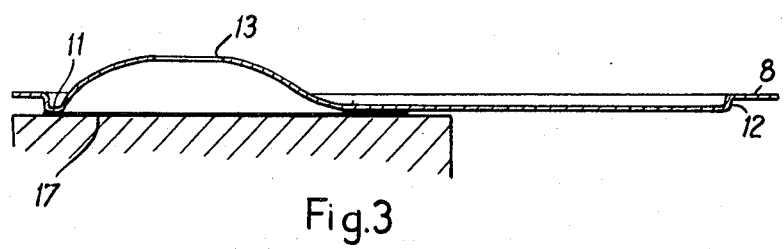
Fig.3
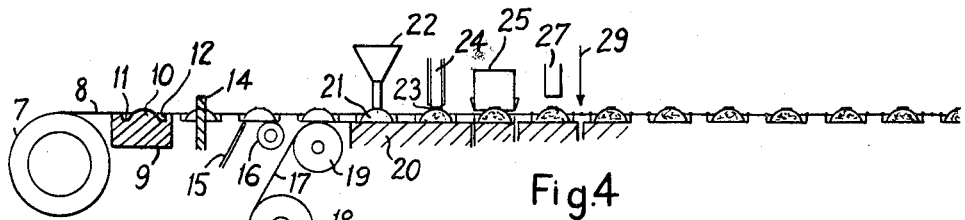
Fig.4
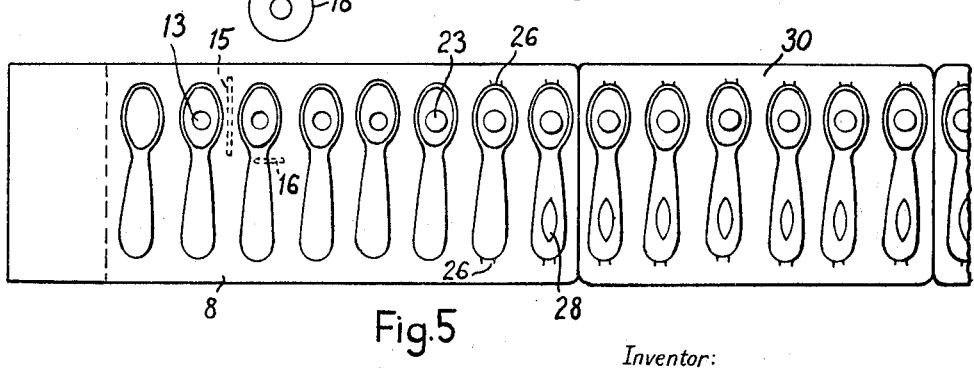
Fig.5
Inventor:
ALFRED E.R. ARNOT
BY Benjamin de Corter
AGENT

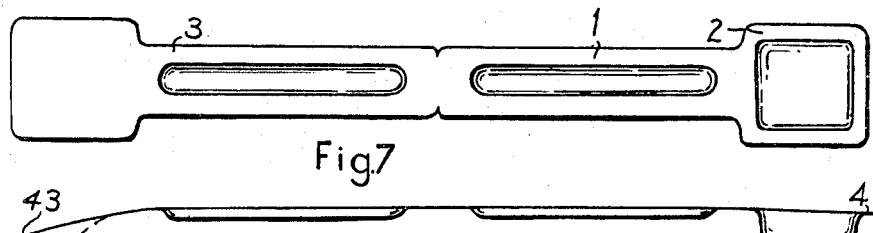
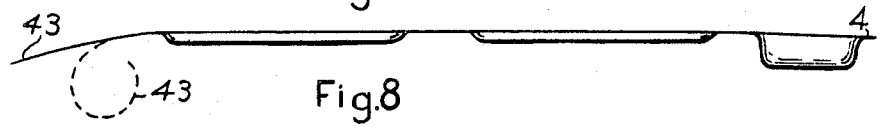
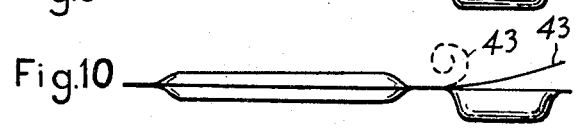
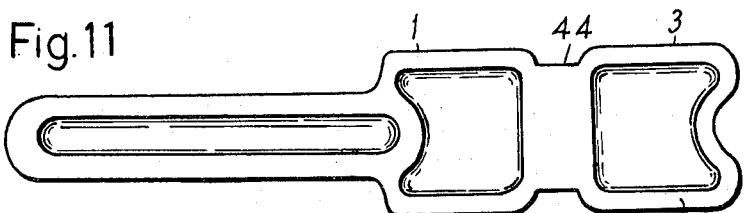
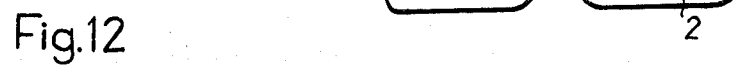
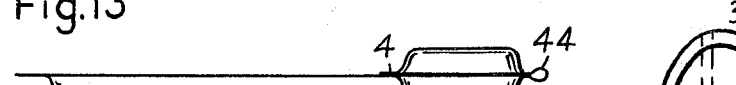
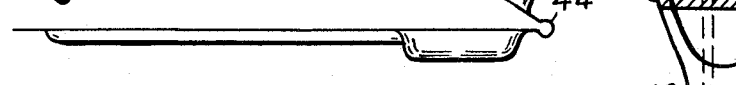
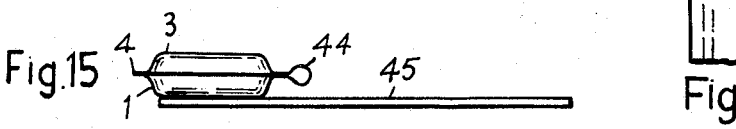
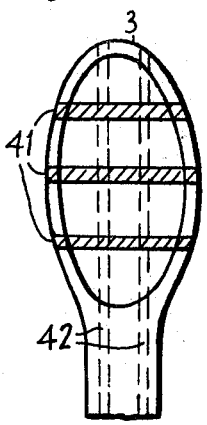

3,386,837
FOODSTUFF PACKAGING
Alfred Erwin Reginald Arnot, The Bell House, Baughurst, Basingstoke, Hampshire, England
Continuation-in-part of application Ser. No. 222,999, Sept. 10, 1962. This application Oct. 22, 1965, Ser. No. 502,159
Claims priority, application Great Britain, Sept. 12, 1961, 32,598/61
15 Claims. (Cl. 99—171)

ABSTRACT OF THE DISCLOSURE

A unit package comprising a spoon with a consumable concentrate therein and a substantially impermeable, adhesively secured cover hermetically enclosing said concentrate in said spoon with said adhesive releasing said cover from said spoon upon immersing in hot water, thereby releasing said concentrate.

---

The present application is a continuation-in-part of my copending application Ser. No. 222,999 filed Sept. 10, 1962, now abandoned.

This invention is concerned with foodstuff packaging, and in particular with means for the convenient storage and use of concentrated foodstuffs and beverages requiring reconstitution in hot or boiling water.

It is an object of the present invention to provide a substantially impermeable storage package comprising a unit portion of concentrated or dehydrated foodstuff or beverage or mixture thereof, hereinafter called consumable concentrate, attached to an appropriate utensil and adapted to be automatically opened by immersion in hot water.

It is further an object of the invention to provide means for the production of said packages, and for their distribution in convenient multiples.

Many consumable concentrates such as meat or vegetable extracts, milk foods, concentrated soup solids, and dehydrated or accelerated freeze dried meats and vegetables are prepared for simple reconstitution by immersion in hot or boiling water. The food beverage thus prepared may require a utensil such as a spoon or stirrer to facilitate preparation or consumption, and in many circumstances the use of an expendable utensil is advantageous for this purpose.

Concentrated foodstuffs and beverages are particularly suitable for consumption in offices and factories, on picnics, in emergency rations or vending machines, as well as general use in the home; in these circumstances a wide choice of contents in unit portions with expendable accessories according to the invention, which may be carried for long periods without deterioration in pockets, handbags or vehicles, is exceptionally convenient.

It will be appreciated that if a source of boiling water is available, a compact selection of unit portions according to the invention can provide an instant alternative choice of beverage to a number of consumers. Thus offices and factories may install small water boilers throughout their premises, and sell proprietary "beverage spoons" in their canteens to meet the individual worker's choice, thereby eliminating many managerial responbilities in industry associated with the service of beverages or dispensing machine installations. At the same time, the automatic opening of the package in hot water permits the hygienic preparation of the beverage by a consumer with dirty hands, as no part of the submerged spoon need be touched.

According to this invention there is provided a unit package of consumable concentrate reconstitutable in hot water, which comprises a utensil having substantially impermeable cover means, consumable concentrate hermetically enclosed within the said utensil by the said cover means, and a sealing means, said sealing means being releasable by immersion in hot water, and said cover means being adapted to springily distort from said utensil and tending to draw apart said sealing means when immersed in hot water, whereby said consumable concentrate is exposed to mix freely with the hot water.

Said cover means adapted to springily distort may be provided by the use of prestressed material such as unannealed axially or biaxially stretched plastics film for the cover means; or by providing that the making of the seal requires a springy deflection or un-coiling of the cover from its free configuration or position to which it will return when the sealing adhesive is released, or by the use of laminated metal foil or plastics film or combinations thereof which have different ratios of expansion and thereby deform when heated.

There may also be used for the cover means plastic film prestressed by lamination with another plastic film, plastic film prestressed by coating with a lacquer, plastic film prestressed by strips applied as bow-springs, prestressed metal foil or bimetallic laminates.

Conveniently said utensil may be expendable and comprise a plastic spoon having a bowl capacity to contain a unit portion of said consumable concentrate with which it is to be filled, or it may comprise a flat stirrer or pronged fork or serrated knife or combination thereof. Said hot water releasable sealing means may be an adhesive or wax or plastic resistant to storage conditions and the contained consumable concentrate, with a reactivation or solution or decomposition temperature lower than that of the hot water to be used for reconstitution of the food or beverage.

Hot water-releasable sealing means which may be employed in the practice of the present invention include for example, carboxymethyl-dextran or an alkali metal salt thereof having associated therewith a compatible plasticising or softening agent, or a vinyl chloride-vinyl acetate copolymer for instance a sealing composition of the type disclosed in U.S.P. 2,878,128 published Mar. 17, 1959, or a composition such as adhesive EC. 1383X marketed by the Minnesota Mining & Manufacturing Co., which is resistant to high humidity and deep-freezing, has high resistance to oils and reactivates at 80° C.

Said stressed cover means may be composed of plastic materials or metal, in the form of foil, film or sheet. The cover means by being stretched or prestressed during manufacture or before being sealed in position without being annealed will, on release by hot water of the hot water releasable sealing means attaching it to the utensil, shrink or spring into a distorted or curved configuration, thereby drawing apart the seal and positively exposing the consumable concentrate to the hot water. Such film, foil or sheet may be axially or biaxially stretched plastic. Suitable plastics include rubber hydrochloride, polyethylene terephthalate, polypropylene etc.

Metal or plastic strips may be used as bow-springs to provide such prestressing and laminated in or attached to stressed or unstressed plastic films for the purpose. Watch-spring or hair-spring strip may be used.

Metal foil may be treated to tend to revert to a curved shape when heated to about 100° C. or comprise a bimetallic laminate for the purpose.

Plastic materials employed in the construction of said utensil or stretched cover or sealing means may comprise additions or compounds or surface treatments or laminations with metal and the like as known in the art for the better preservation of the contents.

Said stretched cover means may wholly envelop said contents or may complete an enclosure including all or part of said utensil, and may be locally connected to said utensil by permanent adhesive or heat-seal or mechanical means to prevent its detachment therefrom after opening in hot water.

This local connection of the cover means by a spot of permanent adhesive or heat seal may be at any point of the sealing means but most conveniently in the embodiments comprising a spoon at the handle neck or the spoon tip. After the foodstuff or beverage has been reconstituted by stirring, the spoon may be withdrawn and the cover means detached manually.

The shrinkage may be arranged to tear a prepared seam in the package, or contract against cutting, tearing or piercing means associated with the attached utensil. Moreover the contraction and rupture of the cover will serve to provide immediate exposure of the contents, thereby preventing coagulation of certain products such as milk powders.

Thus a "coffeespoon" may comprise a thin flat wooden spoon having a conventional narrow handle outline and a "bowl" terminating in outwardly tapering sides like a shovel, and having three pointed serrations on the base of which the two outer peaks coincide with the tapering sides.

In certain cases in which the order of solution of beverage constituents may be critical, such as the solution of milk powder before coffee to prevent curdling, double packages may be provided on the utensil to introduce a time delay between the discharge of the contents. Thus powdered milk may be directly packed under a first contracting plastic cover, whilst the coffee may be contained in a further cover under the first cover so as to be released in sequence.

Identification of the contents of the package may be provided by the shape or colour of the utensil or packaging, or by printing or wording thereon.

The following is a description by way of example only of several embodiments according to the invention, reference being made to the accompanying drawings in which:

FIGURE 1 is a plan view of a package according to the invention.

FIG. 2 is a side elevation of the same package.

FIG. 3 is a longitudinal cross-section of a package prior to filling by the means shown in FIGS. 4 and 5.

FIG. 4 is a schematic elevation of a production sequence for a preferred form of said invention.

FIG. 5 is a plan view of FIG. 4.

FIG. 6 is a plan view of the end of a package as shown in FIG. 1 showing further embodiments of the invention.

FIGURES 7 to 10 show a further embodiment of a package according to the invention at four different stages.

FIGURES 11 to 14 show another embodiment of a package according to the invention at four different stages.

FIGURE 15 shows yet another embodiment of a package according to the invention.

Referring first to FIG. 1, the utensil 1 is a polystyrene spoon-shaped injection moulding, the capacity of the bowl being equivalent to and filled with a unit portion of soup solids. The edge of the bowl 2 presents a flat smooth surface to which is affixed a packaging cover 3 of biaxially stretched polyester film by a latex adhesive 4 having a reactivation temperature of approximately 80° C. The cover 3 is permanently locally attached to the utensil 1 by a line of heat-seal 5, and identification printing 6 is provided on the utensil handle.

FIGS. 4 and 5 show similar utensils continuously produced by vacuum-forming consecutive spoon shapes in a polypropylene sheet as follows:

A suitable coloured or metallised strip of polypropylene 8, approximately 6" wide and .015" thick, is drawn by conventional feed means across a vacuum-forming mould 9. The mould carries a spoon-shaped impression 10 providing a flat surface 11 surrounding the bowl and a strong flanged periphery 12; interchangeable moulds are provided to vary the design of spoon, or the capacity of the bowl to match the unit portion of concentrate to be accommodated.

After vacuum-forming the spoon shape, the strip moves forward one station and a filling hole 13 is pierced in the bowl by the punch 14. A doctor blade and roll coater 15 then applies latex adhesive to the undersurface of the strip, covering the bowl edges and extending a short distance along the spoon handle. A thin line of permanent adhesive is applied by a narrow roller 16 at the boundary of the latex area.

The strip may now pass through a suitable adhesive solvent evaporating stage, not shown, after which a ribbon about 2½" wide of biaxially stretched polyester film 17 drawn from a roll 18 is passed over a roller 19 to cover the adhesive-coated area beneath the strip. The ribbon 17 may be printed, coloured, clear, opaque, metallised, laminated or coated as desired for identification, advertisement, preservation or concealment of the contents of the spoon.

The spoon is now as shown in cross-section in FIG. 3, and reaches the filling station at which it is supported on a surface 20 whilst being filled with a unit portion 21 of concentrate through the hole 13 by a filler head 22. At the next station a polypropylene disc 23 is heat-sealed to the flat periphery of the hole 13 by a tool 24; then a punch 25 shears the outline of each side of the spoon, leaving two attachment tongues 26 to retain the spoon within the strip 8; a printing stage applies advertising and identification by direct printing, embossing or labelling means 27 to the handle at 28; and a transverse shear 29 operating at settable multiples of spoon pitch cuts off unit "cards" 30 of spoons suitable both for multiple packaging and retail distribution, and from which consumers may extract one spoon at a time as required.

By this process, the contents of the spoons are sealed against storage conditions to a better degree than an average plastic pack, as the plastic moulding and covering surfaces are comparatively substantial. As soon as a spoon is immersed in very hot or boiling water, the cover is released by the adhesive around the bowl, but remains attached to the handle by the line of heat-seal or permanent adhesive; at the same time the cover material shrinks to about one-quarter of its previous size, leaving the contents of the bowl exposed to the water for reconstitution. The discharged spoon, from which the shrunken cover may be detached manually if desired, is then available for stirring and consuming the reconstituted food or beverage product.

Further embodiments of the invention are illustrated in FIG. 6, wherein the cover 3 is of conventional or unstressed plastic film or metal foil and is bonded to bowspring strips, which are of arc form when unstressed, 41 and/or 42. The spring strips may be bonded to the lower or upper surface of the plastic film or incorporated in it. The plastic film and spring strip for making the cover means may be in continuous form in rolls. It is pressed or stretched flat againts the utensil whilst being bonded to it and until the adhesive is set. The strips should face the direction whereby the convex side of the arc is towards the utensil. The outline of the utensil and cover means is then sheared off as described above.

When the cover means is immersed in hot water, the strips tend to assume a curvature which is convex towards the utensil and thus as the adhesive yields the strips pull the edges of the cover means away from the utensil.

It will be understood that in the production sequence schematically shown in FIGS. 4 and 5, provision may be made to multiply the simultaneous output of each stage by the use of multiple tools as known in the art.

FIGS. 7 to 10, 11 to 14 and 15 show embodiments wherein the utensil 1 and cover means 3 are integrally stamped from a sheet of aluminium foil. The hot water releasable adhesive 4 is applied around edge 2. FIGS. 7 and 8 show plan and side views of a utensil and cover with a springy curved or coiled end 43 before filling. FIG. 9 shows a side view of the package filled and the cover sealed flat. FIG. 10 shows the springy curved or coiled end 43 released by immersion in hot water. FIGS. 11 and 12 show an embodiment in which the cover means 3 is connected to the utensil 1 by a portion 44 which forms a spring hinge and comprises the stress-applying means, which urges the seal 4 apart as shown in FIGS. 13 and 14 when immersed in hot water. In FIG. 15 the package is a capsule attached to a plastic or wood handle 45.

It will also be understood that various changes may be made in the form and construction of the invention without departing from the concept thereof as defined in the accompanying claims.

I claim:

1. A unit package of consumable concentrate reconstitutable in hot water, which comprises a spoon having a handle portion and a bowl portion, consumable concentrate in said bowl portion, a substantially impermeable cover means being adapted to springily distort and being selected from the group consisting of axially and biaxially stretched plastic film, said cover means hermetically enclosing said concentrate in said bowl portion of said spoon, an adhesive attaching said cover means to said spoon bowl, said adhesive releasing said cover means when immersed in hot water, whereby said cover means springily distorts from said spoon and releases said consumable concentrate.

2. A unit package as claimed in claim 1, comprising hot-water resistant attachment means attaching a portion of said cover means to said spoon.

3. A unit package as claimed in claim 1, wherein a portion of said cover means is attached to the handle portion of said spoon by an adhesive which prevents the release of said cover means from said handle when the spoon is immersed in hot water.

4. A unit package as claimed in claim 1, wherein said spoon bowl has a filler hole in its base and closure means sealing said hole.

5. A multiple assembly of unit packages as claimed in claim 1, said assembly comprising a sheet wherein a plurality of said spoons are integral detachable portions.

6. A unit package as claimed in claim 1, wherein said adhesive comprises a carboxymethyldextran.

7. A unit package as claimed in claim 1, wherein said adhesive comprises a vinylchloride-vinyl acetate copolymer.

8. A unit package as claimed in claim 1, comprising a hot water resistant bond attaching a portion of said cover means to the shaft of the spoon.

9. A unit package as claimed in claim 8, wherein said cover means comprises biaxially stretched unannealed polypropylene film.

10. A unit package as claimed in claim 8, wherein said cover means comprises biaxially stretched unannealed rubber hydrochloride film.

11. A unit package as claimed in claim 8, wherein said cover means comprises biaxially stretched unannealed polyester film.

12. A unit package as claimed in claim 11, wherein said polyester is polyethylene terephthalate.

13. A unit package as claimed in claim 12, wherein said adhesive comprises a vinyl chloride-vinyl acetate copolymer.

14. A unit package as claimed in claim 12, wherein said adhesive comprises a carboxymethyldextran.

15. A unit package as claimed in claim 9, wherein said spoon is made of polypropylene.

References Cited

UNITED STATES PATENTS

| | | | |
|---|---|---|---|
| 1,367,568 | 2/1921 | Smith. | |
| 1,393,045 | 10/1921 | Scott | 99—77 X |
| 2,092,510 | 9/1937 | Haut | 99—77.1 |
| 2,878,128 | 3/1959 | Jorgenson | 99—192 |
| 2,982,394 | 5/1961 | Noyak | 99—77.1 X |
| 3,154,418 | 10/1964 | Lovell et al. | 99—77.1 |

RAYMOND N. JONES, *Primary Examiner.*